(12) United States Patent
Massicot et al.

(10) Patent No.: US 9,900,311 B2
(45) Date of Patent: Feb. 20, 2018

(54) METHOD AND DEVICE FOR PROTECTING ACCESS TO A MESSAGE

(71) Applicant: ADVANCED TRACK AND TRACE, Rueil-Malmaison (FR)

(72) Inventors: Jean-Pierre Massicot, Rueil-Malmaison (FR); Alain Foucou, Rueil-Malmaison (FR); Zbigniew Sagan, Rueil-Malmaison (FR)

(73) Assignee: ADVANCED TRACK AND TRACE, Rueil-Malmaison (FR)

( * ) Notice: Subject to any disclaimer, the term of this patent is extended or adjusted under 35 U.S.C. 154(b) by 71 days.

(21) Appl. No.: 15/100,823

(22) PCT Filed: Dec. 2, 2014

(86) PCT No.: PCT/FR2014/053130
§ 371 (c)(1),
(2) Date: Jun. 1, 2016

(87) PCT Pub. No.: WO2015/082831
PCT Pub. Date: Jun. 11, 2015

(65) Prior Publication Data
US 2016/0301696 A1    Oct. 13, 2016

(51) Int. Cl.
*H04L 29/06* (2006.01)
*G07C 9/00* (2006.01)
(Continued)

(52) U.S. Cl.
CPC ... *H04L 63/0876* (2013.01); *G06Q 20/40145* (2013.01); *G07C 9/00087* (2013.01);
(Continued)

(58) Field of Classification Search
None
See application file for complete search history.

(56) References Cited

U.S. PATENT DOCUMENTS 6,101,602 A * 8/2000 Fridrich ............... G06T 1/005
                                                           713/176
2001/0011680 A1 * 8/2001 Soltesz ............. G07C 9/00087
                                                           235/379
(Continued)

FOREIGN PATENT DOCUMENTS

FR    2 957 705 A1    9/2011

OTHER PUBLICATIONS

Noore et al., "Embedding biometric identifiers in 2D barcodes for improved security," Computers & Security, Dec. 1, 2004, pp. 679-686, vol. 23, No. 8, Elsevier Science Publishers, Amsterdam, NL.

*Primary Examiner* — Peter Poltorak
(74) *Attorney, Agent, or Firm* — Im IP Law; C. Andrew Im

(57) ABSTRACT

A device for reading a message includes a reader to read biometric data of a holder of the medium and a scanner to capture, on a medium, an encoded message having elementary message units. The message includes a noise that consists of marking defects of the message on the medium which are random and unpredictable for each elementary message unit. A noise reducer to reduce the noise of the captured message based on biometric data. A decoder to decode at least one portion of the message in which the noise has been at least partially removed. Preferably, the decoder utilizes redundancies of the message with the noise removed to determine at least one portion of the encoded message.

14 Claims, 5 Drawing Sheets

(51) Int. Cl.
*G06Q 20/40* (2012.01)
*H04L 9/08* (2006.01)

(52) U.S. Cl.
CPC ........ H04L 63/0861 (2013.01); *H04L 9/0866* (2013.01); *H04L 2209/046* (2013.01)

(56) References Cited

U.S. PATENT DOCUMENTS

| | | | |
|---|---|---|---|
| 2002/0116508 A1* | 8/2002 | Khan | H04L 51/24 709/229 |
| 2002/0174346 A1* | 11/2002 | Ting | H04L 63/0428 713/186 |
| 2010/0052852 A1* | 3/2010 | Mohanty | G07C 9/00087 340/5.83 |
| 2011/0135160 A1* | 6/2011 | Sagan | G06K 9/00577 382/108 |
| 2012/0255029 A1* | 10/2012 | Kim | G06F 21/10 726/26 |
| 2016/0182239 A1* | 6/2016 | Terborg Del Rosal | H04L 9/3263 713/175 |

* cited by examiner

METHOD AND DEVICE FOR PROTECTING ACCESS TO A MESSAGE

RELATED APPLICATIONS

This application is a § 371 application from PCT/FR2014/053130 filed Dec. 2, 2014, which claims priority from French Patent Application No. 13 61933 filed Dec. 2, 2013, each of which is incorporated herein by reference in its entirety.

TECHNICAL FIELD OF THE INVENTION

The present invention concerns a method and a device for protecting access to a message. It applies, in particular, to security documents and bank cards.

STATE OF THE ART

Many ways of protecting content or a message borne on a medium are known. For example, encoding or encryption is applied to the data making up this message. However, simply knowing the decoding or decryption key makes it possible to access the message. However, these keys must be stocked on media, eg paper, plastic or electronic, or on servers. Irrespective of whether these keys are carried by the user or stored in a computer system, a malicious third party with the right tools can reach them.

These protections are therefore inadequate.

SUBJECT OF THE INVENTION

The present invention aims to remedy all or part of these drawbacks.

To this end, according to a first aspect, the present invention envisages a device for reading a message, which comprises:
- a means of reading biometric data of a holder of the medium;
- a means of capturing, on a medium, an encoded message comprising elementary message units, said message having noise that consists of marking defects of the message on said medium which are random and unpredictable for each elementary message unit;
- a means of reducing the noise of the captured message, based on biometric data; and
- a means of decoding at least one portion of the message in which the noise has been at least partially removed.

Thanks to these provisions, at least one portion of the encoded message cannot be accessed when the authorized holder of the medium, whose biometric data is required, is absent. In addition, the device that is the subject of the present invention can be autonomous in respect of any remote information source, eg a server on a computer network.

In some embodiments, the means of decoding utilizes redundancies of the message with the noise removed to determine at least one portion of the encoded message.

Thanks to these provisions, the portion of the message to be decoded can be accessed without utilizing a remote information source.

In some embodiments, the means of reading biometric data is configured to read a fingerprint of the holder of the medium.

In some embodiments, the means of reading biometric data is configured to capture an image of the face or of the hand of the holder of the medium.

Thanks to these provisions, biometric data is captured with no contact between the holder of the medium and the device, reducing requirements for cleaning and risks of contamination.

In some embodiments, the means of reducing noise calculates a biometric data hash and utilizes the hash to reduce the noise in the captured message.

In some embodiments, the means of reducing noise utilizes a symmetrical hash.

For example, a symmetrical hash comes from a symmetrical key encryption.

In some embodiments, the means of decoding is configured to decode biometric data.

Thanks to these provisions, the reading device enables biometric data to be displayed, eg for visual confirmation of the identity of the holder of the medium, or an additional automatic verification of the identity of the holder of the medium.

In some embodiments, the means of decoding is configured to utilize an asymmetric key to access at least one portion of the message.

Thanks to these provisions, the reading device that is the subject of the present invention can be autonomous by having a set of keys, eg public keys from a public key infrastructure (PKI).

In some embodiments, the reading device that is the subject of the present invention comprises a means of inputting a secret code by the holder of the medium, the means of decoding being configured to utilize said secret code to access at least one portion of the message.

Thanks to these provisions, the consent of the holder for reading the message can be formalized by entering the secret code.

In some embodiments, the reading device that is the subject of the present invention comprises a means of storing and communicating payment information.

Thanks to these provisions, the payment is secured, since the identity of the holder of the medium has been verified through the use of biometric data.

According to a second aspect, the present invention envisages a method for reading a message, which comprises:
- a step of reading biometric data of a holder of the medium;
- a step of capturing, on a medium, an encoded message comprising elementary message units, said message having noise that consists of marking defects of the message on said medium which are random and unpredictable for each elementary message unit;
- a step of reducing the noise of the captured message, based on biometric data; and
- a step of decoding at least one portion of the message in which the noise has been at least partially removed.

According to a third aspect, the present invention envisages a device for marking a message on a medium, which comprises:
- a means of reading biometric data of a holder of the medium;
- a means of encoding at least one portion of the message;
- a means of adding noise to the encoded message, based on biometric data; and
- a means of marking, on a medium, the encoded message comprising elementary message units, configured so that said marking has noise that consists of marking defects of the message on said medium which are random and unpredictable for each elementary message unit.

According to a fourth aspect, the present invention envisages a method for marking a message on a medium, which comprises:
- a step of reading biometric data of a holder of the medium;
- a step of encoding at least one portion of the message;
- a step of adding noise to the encoded message, based on biometric data; and
- a step of marking, on a medium, the encoded message comprising elementary message units, during which said marking has noise that consists of marking defects of the message on said medium which are random and unpredictable for each elementary message unit.

According to a fifth aspect, the present invention envisages a mark representative of an encoded message with noise added based on biometric data and comprising elementary message units, said mark having, in addition, noise that consists of marking defects of the message on said medium which are random and unpredictable for each elementary message unit.

As the particular features, advantages and aims of this reading method, this marking device, this marking method and this mark are similar to those of the reading device that is the subject of the present invention, they are not repeated here.

BRIEF DESCRIPTION OF THE FIGURES

Other advantages, aims and particular features of the present invention will become apparent from the description that will follow, made, as a non-limiting example, with reference to drawings included in an appendix, wherein.

DESCRIPTION OF EXAMPLES OF REALIZATION OF THE INVENTION

Figure 1:
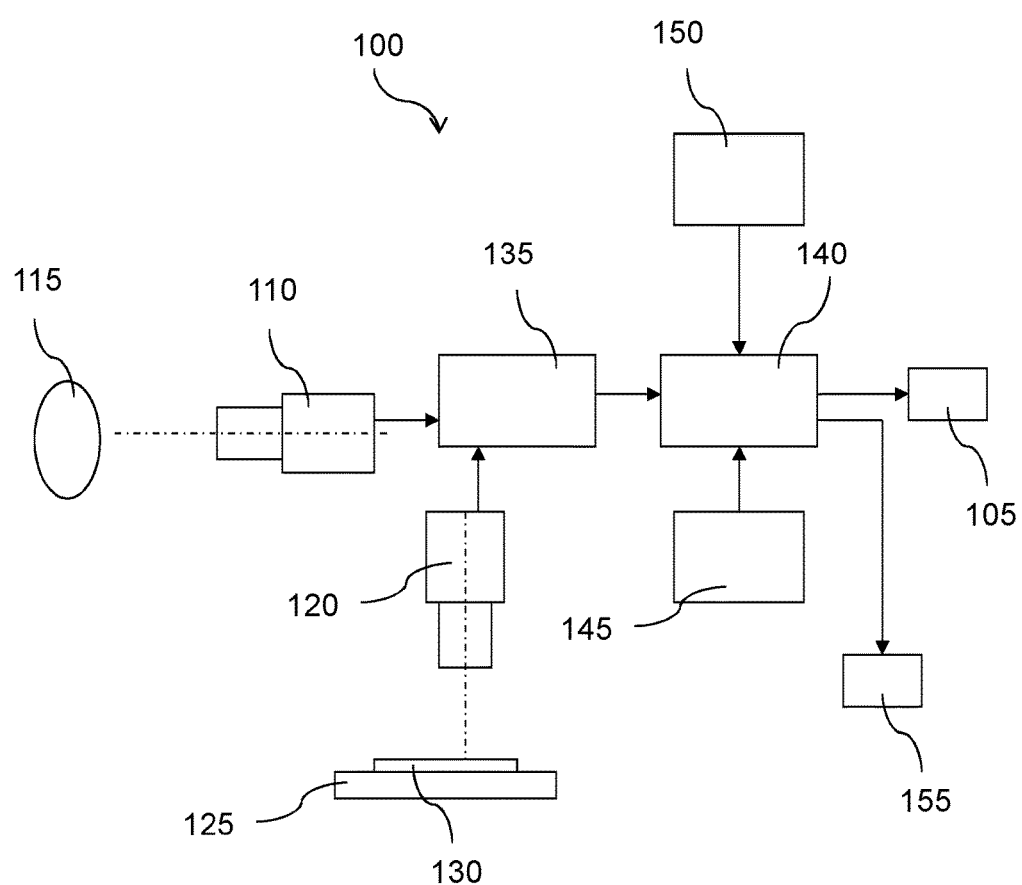
FIG. 1 represents, schematically, a particular embodiment of the reading device that is the subject of the present invention.
Figure 3:
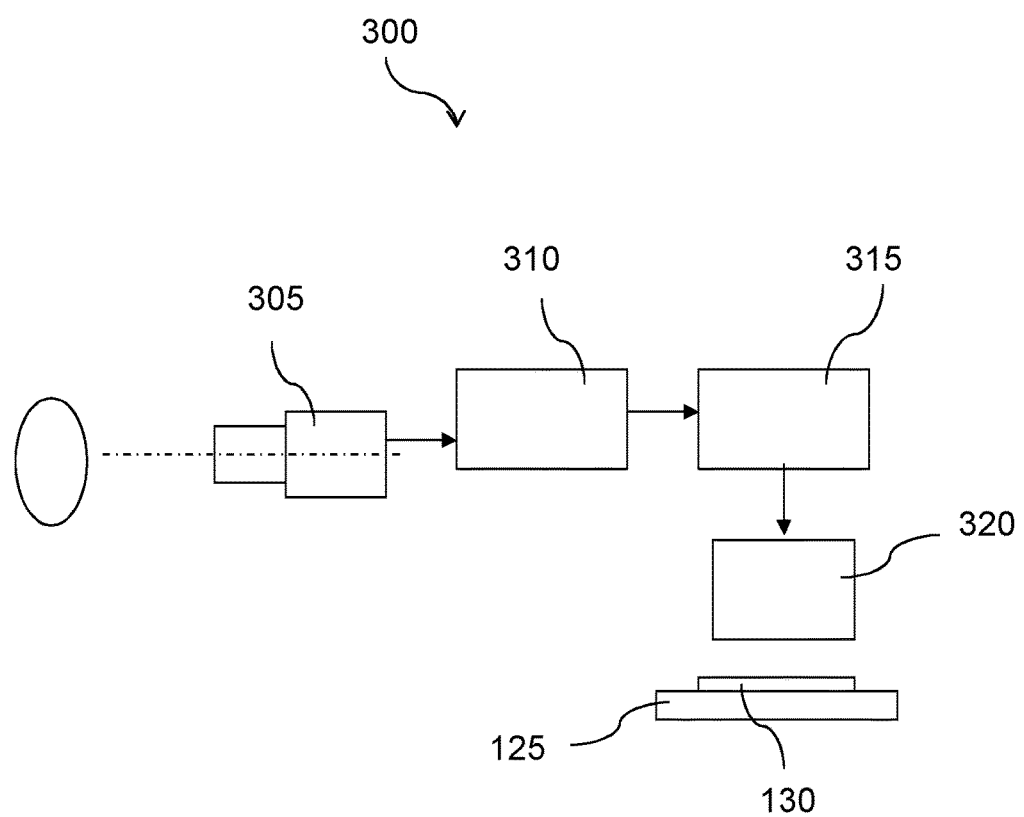
FIG. 3 represents, schematically, a particular embodiment of the marking device that is the subject of the present invention.

It is now noted that FIGS. 1 and 3 are not to scale.

FIG. 1 shows a device 100 for reading a message 105, which comprises:
- a means 110 of reading biometric data 115 of a holder of the medium;
- a means 120 of capturing, on a medium 125, an encoded message 130 comprising elementary message units, said message having noise that consists of marking defects of the message on said medium, said defects being random and unpredictable for each elementary message unit;
- a means 135 of reducing the noise of the captured message, based on biometric data; and
- a means 140 of decoding at least one portion of the message in which the noise has been at least partially removed.

The means 110 of reading biometric data is, for example, a reader of at least one fingerprint of the holder of the medium, or a camera configured to capture a profile of one hand or of the head of the holder of the medium. The means 110 of reading biometric data provides data characteristic of the body part of the holder of the medium that is analyzed, eg the characteristic points of a fingerprint, the lengths and shapes of the fingers of the hand, or the respective dimensions and positions of the components of the face. In some embodiments, the means of reading biometric data 110 captures the user's voice.

The medium 125 can be, for example, an identity or payment card, a sheet of paper, a label. The effect of marking the message on the medium is to modify locally at least one physical characteristic of the medium, on the surface or within the thickness. For example, the marking is printed, with or without ink. The encoded message 130 comprises elementary message units, said message having noise that consists of marking defects of the message on said medium, said defects being random and unpredictable for each elementary message unit. The error rate caused by the marking noise is preferably greater than five percent, ie at least five percent of the marking's elementary units are modified in sufficiently random manner such that they are incorrectly read by the means of capture.

The means 120 of capturing the message 130 is for example a matrix image sensor or a scanner.

The means 135 of reducing the noise of the captured message based on biometric data is configured to calculate a biometric data hash and to utilize said hash to reduce the noise of the captured message.

It can be seen here that even though the biometric data is different, between adding noise and reducing noise, because they correspond with two captures made at different times and under different conditions, their processing, which extracts characteristics, eg by frequency analysis, frequency transformation or hash extraction, provides data with low but not null variation. By applying these characteristics, with noise since they are variable, to the message, the noise affecting this message is increased or decreased.

For example, starting from a digital trace whose dimensions and angles have been normalized, singular points (including minutiae) that are also normalized are extracted. By applying an "exclusive OR" function to an image of this trace or of these singular points or to a hash of these images, noise is added or removed from the message.

It is recalled here that a fingerprint or dactylogram is the result of placing a finger on a medium after the latter has been inked. The design formed on the medium consists of dermatoglyphs. Fingerprints are unique and characteristic of each individual.

A "digital trace", a broader term, is the result of a contact between a finger and a medium, fingerprints being an example of a digital trace.

Papillary traces (or their imprints) group digital traces (or their imprints, in which automatic identification software reference 150 to 200 characteristic points) and palm traces (traces of the palms of the hand, referenced by 1,500 to 2,000 characteristic points).

This is analogous to a voiceprint authenticated by speaker recognition techniques.

The digital trace can be:
- visible (or direct): it is called positive when material is affixed and it is called negative when material is removed;
- latent (invisible to the naked eye): the trace come from deposited sweat (secretions from the sweat glands: 99% water that by evaporating leaves behind salts and amino-acids) and/or sebum deposits (sebaceous glands); and/or molded: the trace comes from a finger coming in contact with a malleable surface (wax, putty, etc).

Fingerprints can be broken down into three major design types: arches (including tented arches), left-handed/right-handed loops, and whorls (including coils and swirls). These three types of print fit 95% of human fingers: 60% for loops, 30% for whorls and 5% for arches. Each print belongs to a type class: no-delta, two-delta, three-delta (rare). One-delta fingerprints are divided into subgroups: normals, externals, composites; similarly for two-delta fingerprints: concentric whorls, Z-shaped whorls.

"Singularities" on the loops, arches or whorls are used to differentiate the patterns from one another:

global singularities: core or center: where the ridges converge;

delta: where the ridges diverge;

local singularities (AKA minutiae): irregular areas at the locations of capillary lines (ending ridges, bifurcations, short ridges assimilated to two ending ridges, enclosures).

It is estimated that two identical prints have over one hundred convergence points. French law requires 12 points (called minutiae), 18 collected without constraint to authenticate a suspect's print. From 8 to 10 points a strong presumption can be made thanks to algorithms. In Switzerland, a probabilistic system is used for comparisons: the drawing's probability is calculated based on the statistics of various minutiae appearing: short ridges, forks.

The probability of two persons having the same fingerprint is 1 in $10^{14}$, which is very small on the scale of human population. In addition, its random nature oversteps risks of similarities between individuals who share a genetic makeup: monozygotic individuals such as twins or quadruplets for example will each have a set of fingerprints that is their own and different from that of the other individuals from a single set of siblings, the same applying to the slightly different fingerprints of the left and right hands. This is explained by the fact that genes are responsible for the general architecture of the fingerprints (the three major patterns), whereas embryonic development and the intrauterine living environment have an influence on the singularities.

Preferably, increasing and decreasing noise (means or steps) utilize a symmetrical hash. This principle is relatively easy to implement with biometric data, such as the iris, because it is, by its very nature, an imprint that remains stable over time. By analogy, this biometric data work, for reading, like a barcode.

Among the biometric data that can be utilized for increasing and decreasing noise, the following can be mentioned:

the image of the iris of the eye;

each fingerprint;

data coming from processing an image of the face, eg coming from facial recognition;

data coming from processing an image of the hand, eg coming from recognition of the profile of the hand pressed against a flat surface;

data coming from processing voice capture, eg coming from voice recognition; and data coming from processing a succession of positions, eg coming from gesture recognition, for example gestures of the hand when signing, body movements, eye movements.

The means 140 of decoding at least a portion of the message that has had at least part of the noise removed utilizes redundancies in the message with the noise removed to determine at least one portion of the encoded message. For example, the means 140 knows the positions of the redundant elementary message units or the redundancy generation code, so as to use these redundancies, detect and correct errors making up the noise. For example, the redundancies are in the form of cyclic redundancy check codes (or CRC).

The means of decoding 140 is, in some embodiments, configured to decode biometric data. In some embodiments, the device 100 comprises a means of displaying the biometric data read in the message. A third party can thus visually check the identity of the holder of the medium. In some embodiments, the device 100 comprises a means of automatically checking that the holder of the medium matches the biometric data read in the message.

In some embodiments, the means of decoding 140 utilizes an asymmetric key to access at least one portion of the message.

In the embodiment illustrated in FIG. 1, the device 100 also comprises a means 145 of inputting a secret code by the holder of the medium. For example, the means 145 is a keyboard. The means of decoding 140 is then configured to utilize the secret code to access at least one portion of the message. For example, this secret code is part of a decryption key of the message.

In the embodiment illustrated in FIG. 1, the device 100 comprises a means of storing and communicating payment information. For example, the device 100 sends, using means of communication 155 to a server of the holder of the medium's bank, data coming from a store cash register 150.

As a variant, questioning the user about the transaction is added (a procedure known as "challenge-response") to secure the acquisition of the biometric data by the hardware. In this way, a data signature is introduced to render ineffectual the attack presenting data already collected and possibly intercepted.

Figure 2:
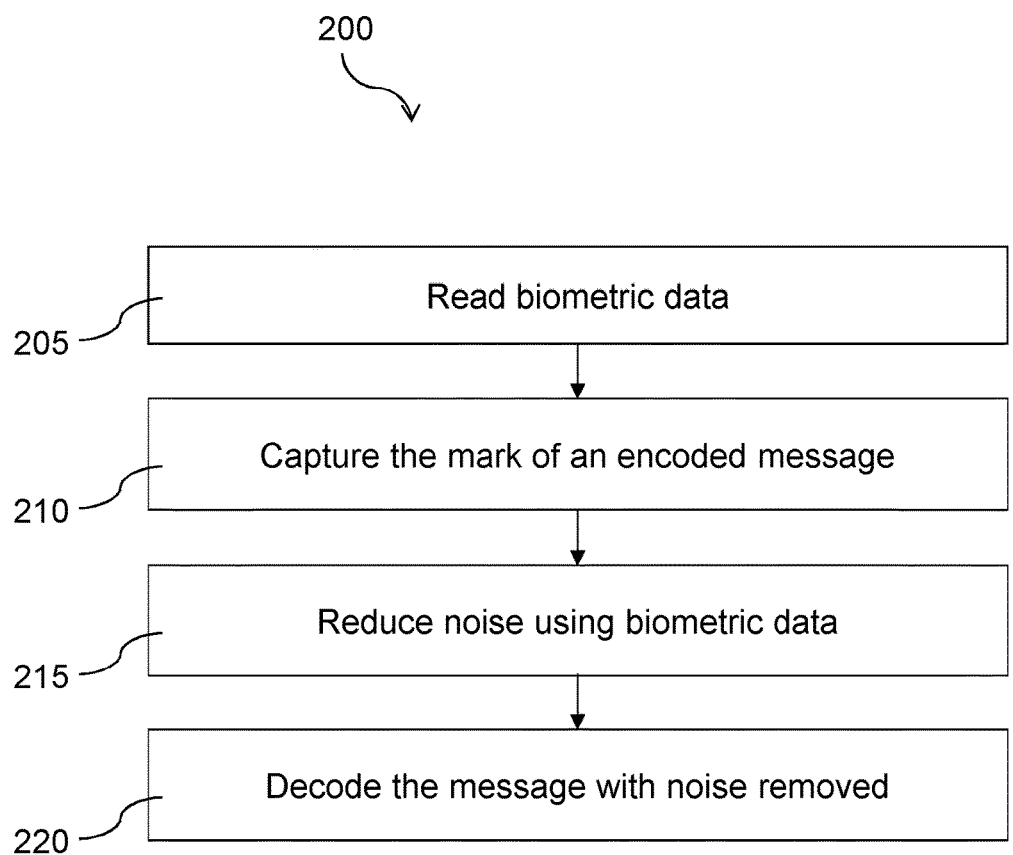
FIG. 2 represents, in the form of a logical diagram, steps in a particular embodiment of the reading method that is the subject of the present invention.

FIG. 2 shows a method for reading a message 200, which comprises:

a step 205 of reading biometric data of a holder of the medium;

a step 210 of capturing, on a medium, an encoded message comprising elementary message units, said message having noise that consists of marking defects of the message on said medium which are random and unpredictable for each elementary message unit;

a step 215 of reducing the noise of the captured message, based on biometric data; and a step 220 of decoding at least one portion of the message in which the noise has been at least partially removed.

FIG. 3 shows a device 300 for marking a message on a medium, which comprises:

a means 305 of reading biometric data of a holder of the medium;

a means 310 of adding noise to an encoded message, based on biometric data;

a means 315 of encoding at least one portion of the message; and a means 320 of marking, on a medium, the encoded message comprising elementary message units, configured so that said marking has noise that consists of marking defects of the message on said medium which are random and unpredictable for each elementary message unit.

In the case where the present invention is utilized to sign an action performed by the holder of the medium bearing the mark representative of the message, the medium serves to authenticate the holder. In the case where the present invention is utilized to sign a document, in addition to authenticating the holder, the content of the document is authenticated. For example, the device 300 serves, when signing a contract, to associate the signatories' identities with a trace, eg a hash of the full content of the contract.

Remember signing before a notary.

Figure 4:
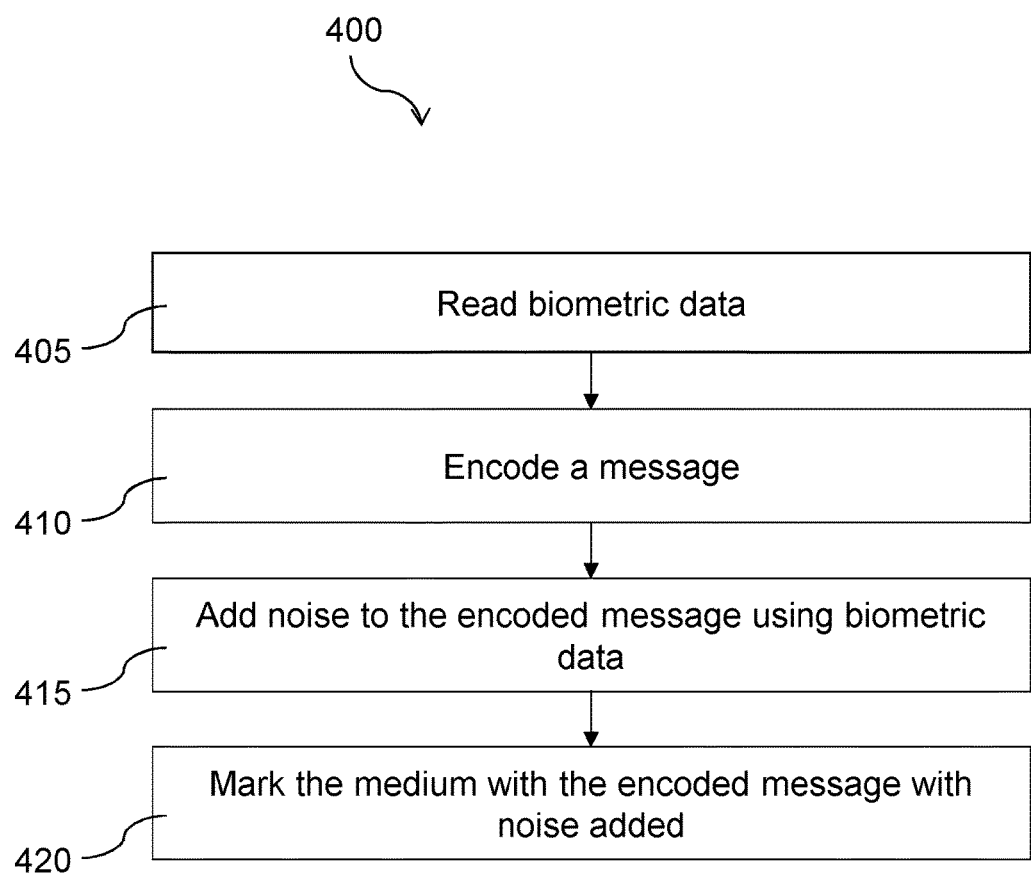
FIG. 4 represents, in the form of a logical diagram, steps in a particular embodiment of the marking method that is the subject of the present invention.

FIG. 4 shows a method 400 for marking a message on a medium, which comprises:
- a step 405 of reading biometric data of a holder of the medium;
- a step 410 of encoding at least one portion of the message;
- a step 415 of adding noise to the encoded message, based on biometric data; and
- a step 420 of marking, on a medium, the encoded message comprising elementary message units, during which said marking has noise that consists of marking defects of the message on said medium which are random and unpredictable for each elementary message unit.

Figure 5:
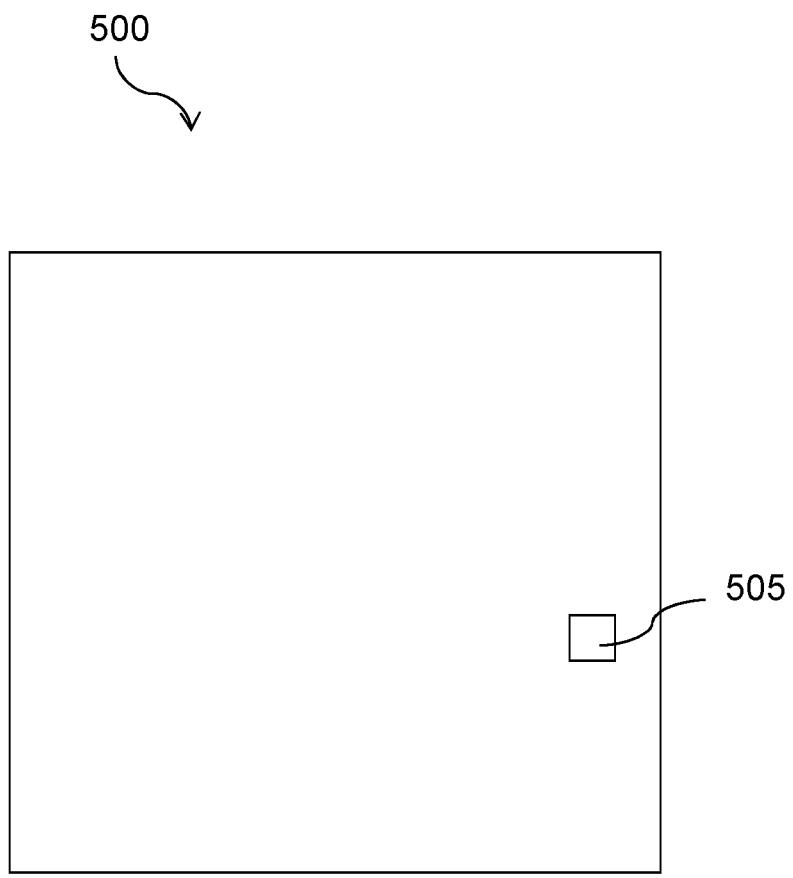
FIG. 5 represents, schematically, a mark that is the subject of the present invention.

FIG. 5 shows a mark 500, which represents an encoded message with noise added according to biometric data and which comprises elementary message units 505. The mark 500 has noise that consists of marking defects of the message on said medium, which are random and unpredictable for each elementary message unit.

The invention claimed is:

1. Device for reading a message, comprising:
   a reader to read a biometric data of a holder of a medium;
   a scanner to capture, on the medium, an encoded message comprising elementary message units, the captured message having a noise that consists of marking defects of the message on the medium which are random and unpredictable for each elementary message unit;
   a noise reducer to reduce the noise of the captured message based on the biometric data; and
   a decoder to decode at least one portion of the captured message in which the noise has been at least partially removed.

2. The device according to claim 1, wherein the decoder utilizes redundancies of the captured message with the noise removed to determine at least one portion of the encoded message.

3. The device according to claim 1, wherein the reader is configured to read a fingerprint of the holder of the medium.

4. The device according to claim 1, wherein the reader is configured to capture an image of a face or a hand of the holder of the medium.

5. The device according to claim 1, wherein the noise reducer calculates a biometric data hash and utilizes the biometric data hash to reduce the noise in the captured message.

6. The device according to claim 5, wherein the noise reducer utilizes a symmetrical hash.

7. The device according to claim 1, wherein the decoder is configured to decode the biometric data.

8. The device according to claim 1, wherein the decoder is configured to utilize an asymmetric key to access at least one portion of the captured message.

9. The device according to claim 1, further comprising an input device to input a secret code by the holder of the medium; and wherein the decoder is configured to utilize said secret code to access at least one portion of the captured message.

10. The device according to claim 1, further comprising a storage to store a payment information and a transmitter to communicate the payment information.

11. A method for reading a message, comprising the steps of:
   reading a biometric data of a holder of the medium;
   capturing, on a medium, an encoded message comprising elementary message units, the captured message having noise that consists of marking defects of the message on the medium which are random and unpredictable for each elementary message unit;
   reducing the noise of the captured message based on biometric data; and
   decoding at least one portion of the captured message in which the noise has been at least partially removed.

12. The method according to claim 11, further comprising the steps of calculating a biometric data hash and adding the noise to the message on the medium utilizing the biometric data hash.

13. A method for marking a message on a medium, comprising the steps of:
   reading a biometric data of a holder of the medium;
   encoding at least one portion of the message;
   adding a noise to an encoded message based on biometric data; and
   marking, on a medium, the encoded message comprising elementary message units, such that the marking has the noise that consists of marking defects of the message on the medium which are random and unpredictable for each elementary message unit.

14. The method according to claim 13, wherein the step of adding the noise comprises the steps of calculating a biometric data hash and utilizing the biometric data hash to add the noise to the encoded message.

* * * * *